O. W. BRAZEAU.
AUTOMATIC DISCOUNT CALENDAR.
APPLICATION FILED JULY 17, 1919.
1,364,030.
Patented Dec. 28, 1920.
2 SHEETS—SHEET 1.
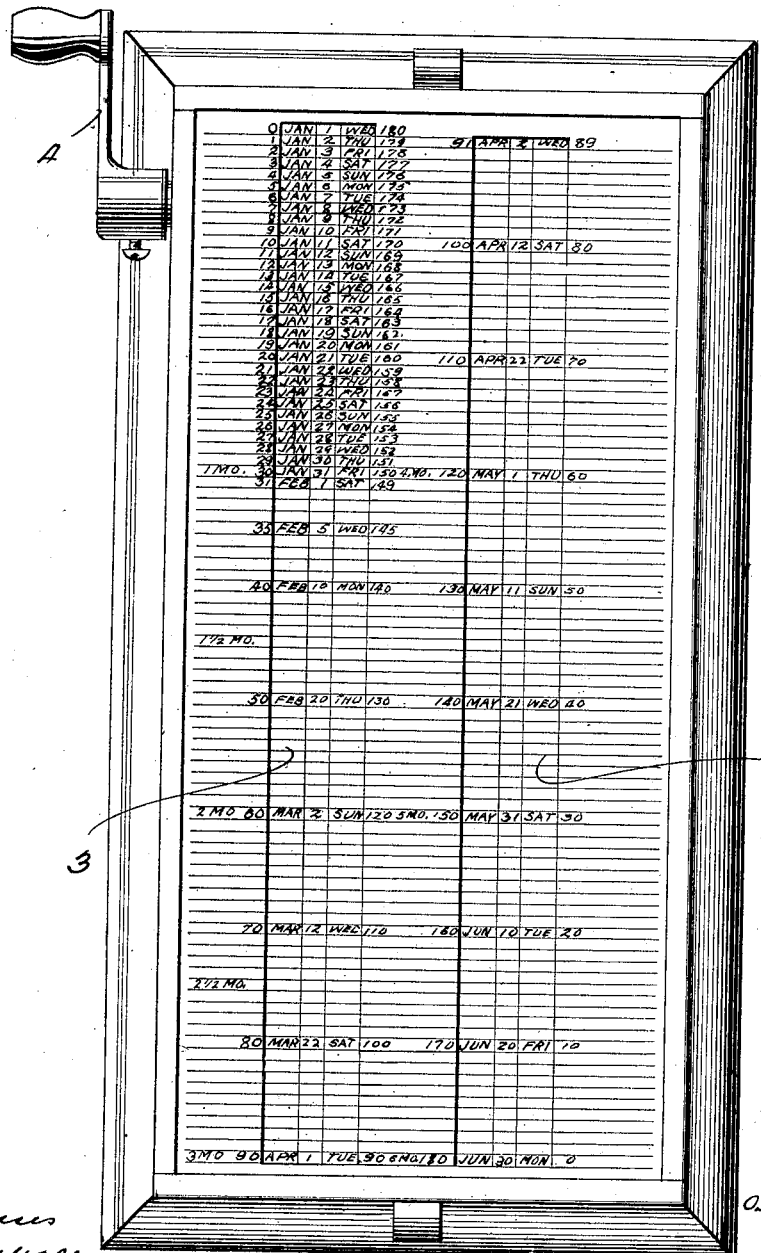

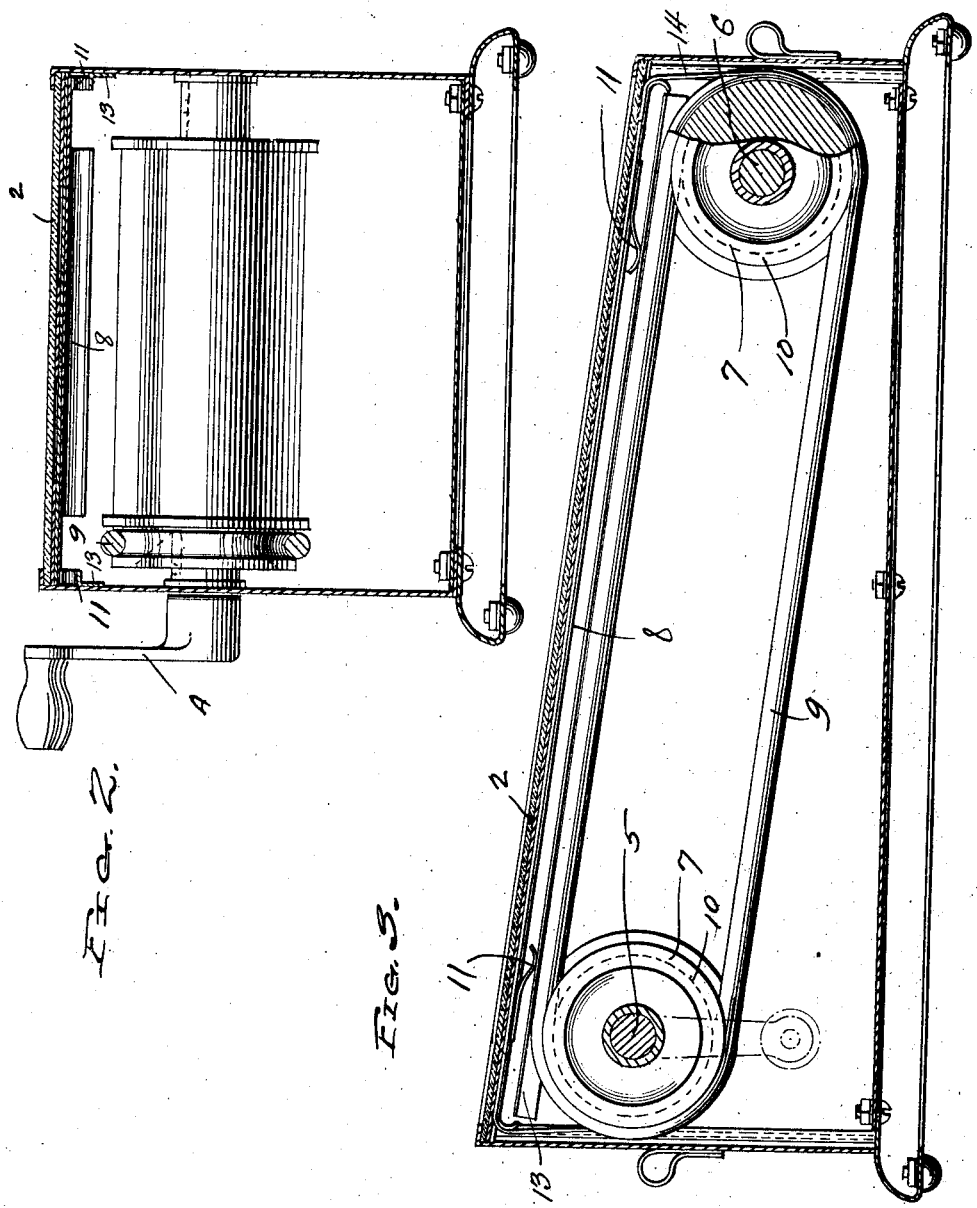

UNITED STATES PATENT OFFICE.

OSCAR W. BRAZEAU, OF LENA, WISCONSIN.

AUTOMATIC DISCOUNT-CALENDAR.

1,364,030.  Specification of Letters Patent.  Patented Dec. 28, 1920.

Application filed July 17, 1919. Serial No. 311,396.

*To all whom it may concern:*

Be it known that I, OSCAR W. BRAZEAU, a citizen of the United States, residing at Lena, in the county of Oconto and State of Wisconsin, have invented certain new and useful Improvements in Automatic Discount-Calendars, of which the following is a specification.

This invention relates to time computing devices and more particularly to an apparatus for determining the dates upon which a note or other obligation will fall due, when the number of days is known.

The primary object of the invention is to provide a calendar which may be readily actuated by turning a crank so that a movable graduated scale will move relatively with a stationary scale whereby the date may be moved to be read with the figures of the stationary scale for indicating the exact date and the number of days intervening between the dates.

The above and additional objects are accomplished by such means as are illustrated in the preferred embodiment and in the accompanying drawings, wherein like characters of reference indicate like or corresponding parts throughout the several views:

Figure 1 is a plan view of the device constructed in accordance with my invention.

Fig. 2 is a transverse section through the same, and

Fig. 3 is a longitudinal vertical section.

Referring to the drawings, wherein is illustrated the preferred form of my invention, the casing is substantially rectangular and is provided with a top wall or panel 2. This wall or panel is provided with two parallel longitudinally extending slots or openings 3 and the surface of the panel is graduated as shown in Fig. 1. The graduations may be as fine as desired and may extend to indicate a graduated part of the month in the years. As shown in Fig. 1, a hand crank 4 extends from one side of the casing and this is mounted upon a shaft 5 extending transversely through the casing at one end thereof. A second shaft 6 is arranged at the opposite end of the casing and each of these shafts is equipped with a roller 7 over which a movable scale 8 is trained. The scale 14 is visible through the openings 3 in the top panel and the two rollers 7 are adapted to be driven by a cable 9, passing over grooved pulleys 10 mounted on the shafts 5 and 6. The movable scale 14 is of flexible material and passes over guide member 8 which is held against the bottom face of the top panel 2 by means of leaf springs 11 which have one end thereof secured to the bottom face of the guide member and the other end bearing against the angle irons 13 which are disposed longitudinally along the side walls adjacent the tops thereof so that the upper portion of the movable scale is held in close proximity to the top panel whereby it may be readily visible through the openings 3 whereby the graduations on the movable scale may be readily alined with the graduations on the stationary panel.

The movable scale is preferably divided into two parts, visible through the two openings 3. The graduations on the movable scale are divided to indicate the days of the year as shown in detail in Fig. 1 where the month of January is set forth in full. Obviously the rest of the scale may be indicated with all of the graduations, it being deemed sufficient for the purpose of this illustration to show the complete month of January.

At each side, of each opening 3, the panel is graduated and the figures indicated thereon, are in consecutive order from 0 to 180 as shown. At the left hand edge of one of the slots 3, the graduations read from the top to the bottom in numerical order, the first graduation being 0. At the opposite edge of the opening, the graduations read reversely, the first graduation being 180. These graduations continue, and of course, in the complete device all of the graduated faces will be provided with suitable characters.

In use, assuming a sixty day note is due on a certain date unknown. It is merely necessary to move the graduated scale until the date indicated on the note is in register with the first graduation on the panel, namely the graduation indicated 0. Then by leaving the date on the movable scale opposite the sixty graduation on the panel, the date on which the note is due will be readily apparent. If desired, certain of the dates, such as Sundays and holidays may be printed in red ink. It may also be found desirable to print on the margin of the top panel, the special legal holidays in the particular State in which the apparatus is being used.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claim.

Having thus fully described my invention what I claim as new and desire to secure by Letters Patent, is:—

In a device of the class described the combination with a casing, a fixed panel mounted on said casing and provided with openings, angle irons carried by the casing adjacent the top thereof, a guide plate having depending curved ends, leaf springs attached to the guide plate and curved so as to engage the angle irons for urging the guide plate upwardly, a movable scale passing over said guide plate, and means for actuating said scale.

In testimony whereof I affix my signature in presence of two witnesses.

OSCAR W. BRAZEAU.

Witnesses:
 EARL DIONNE,
 E. J. BRAZEAU.